(No Model.)
J. J. MARONEY.
VEHICLE AXLE.
No. 271,489. Patented Jan. 30, 1883.
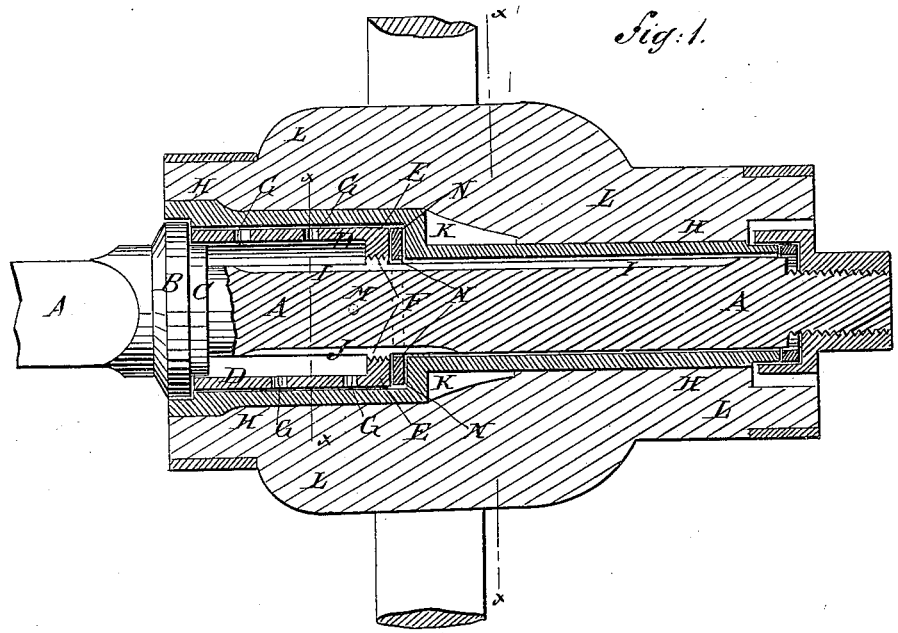
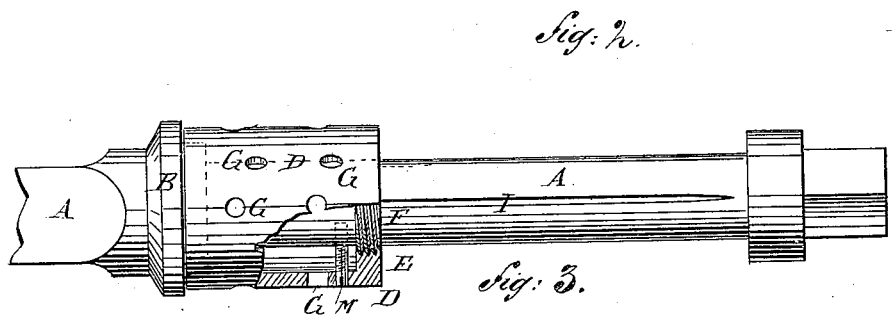
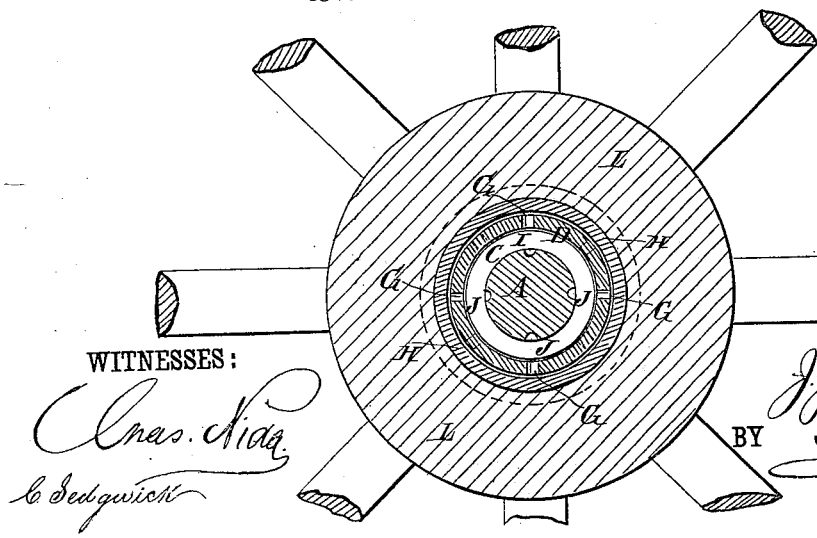
WITNESSES:
INVENTOR:
J. J. Maroney
BY
ATTORNEYS.

UNITED STATES PATENT OFFICE.

JOHN J. MARONEY, OF BERGEN POINT, NEW JERSEY.

VEHICLE-AXLE.

SPECIFICATION forming part of Letters Patent No. 271,489, dated January 30, 1883.

Application filed November 14, 1882. (No model.)

To all whom it may concern:

Be it known that I, JOHN J. MARONEY, of Bergen Point, in the county of Hudson and State of New Jersey, have invented a new and useful Improvement in Vehicle-Axles, of which the following is a full, clear, and exact description.

Reference is to be had to the accompanying drawings, forming part of this specification, in which similar letters of reference indicate corresponding parts in all the figures.

Figure 1 is a sectional side elevation of my improvement, shown with a thimble-skein and hub applied to it. Fig. 2 is a plan view of the improvement, part being broken away. Fig. 3 is a sectional end elevation of the same, taken through the line $x\,x\,x\,x$, Fig. 1.

The object of this invention is to promote convenience in keeping vehicle-axles lubricated.

A represents a vehicle-axle, which is made with a collar, B, at the inner end or base of its arm, in the usual manner. Upon the axle A, at the inner side of the collar B, is formed a second collar, C, to receive and fit into the end of a hollow cylinder, D, which is made of a larger diameter than the diameter of the axle A, and has an inwardly-projecting annular flange, E, formed upon its inner end. The edge of the flange E has a screw-thread formed in it to fit into the screw-thread formed upon the collar F, formed upon or attached to the axle A in proper position to receive the flange E and support the inner end of the cylinder D. The space between the cylinder D and the axle A is designed to receive oil or other lubricant, and may be filled with cotton waste or other packing, if desired. In the shell of the cylinder D is formed a number of holes, G, through which the lubricant can escape to lubricate the outer surface of the cylinder D and the surface of the part of the thimble-skein or axle-box H that fits upon the said cylinder.

In the top of the arm of the axle A is formed a long groove, I, and in the bottom and sides of the said axle-arm are formed short grooves J. The grooves I J pass through the collar F, and are designed to serve as channels to conduct the lubricant from the cylinder D to the forward part of the axle A.

The thimble-skein H is made with an enlargement at its inner end to receive and fit upon the cylinder D, and is provided with wings K to prevent it from turning in the hub L.

The cylinder D is held from turning, when exposed to the friction of a heavy vehicle or load, by conical-pointed screws M, which pass through the shell of the said cylinder, and the points of which enter the side grooves, J, of the axle A.

The friction between the end of the cylinder D and the shoulder of the thimble-skein H is lessened by a washer, N, of leather or other suitable material, interposed between the said end and shoulder.

Having thus described my invention, I claim as new and desire to secure by Letters Patent—

1. The combination of an axle having collars B C F with the cylinder D, fitting over collar C against collar B and screwing on collar F, whereby said cylinder is held as described.

2. The combination, with the skein H, enlarged at its inner end, of the cylinder D, fitting in said enlargement, and having holes by which their adjacent surfaces may be lubricated, as described.

3. In a vehicle-axle, the axle-arm, made with a second collar, C, at the inner side of the base collar, B, and with a third collar, F, at a little distance from the collars B C, to adapt it to receive and support a lubricant-receiving hollow cylinder of a larger interior diameter than the diameter of the said axle, as set forth.

4. The combination, with the lubricant-cylinder D, of an axle having the collar F and the grooves I J passing under said collar, as shown and described.

5. The combination, with the cylinder D and an axle having grooves $f\,f$, of the screws M, having conical points adapted to enter said grooves, as and for the purpose specified.

JOHN J. MARONEY.

Witnesses:
JAMES MARONEY,
MARTIN EDWIN CAVANAGH.